E. S. RITCHIE.
Binnacle.
No. 48,443. Patented June 27, 1865.
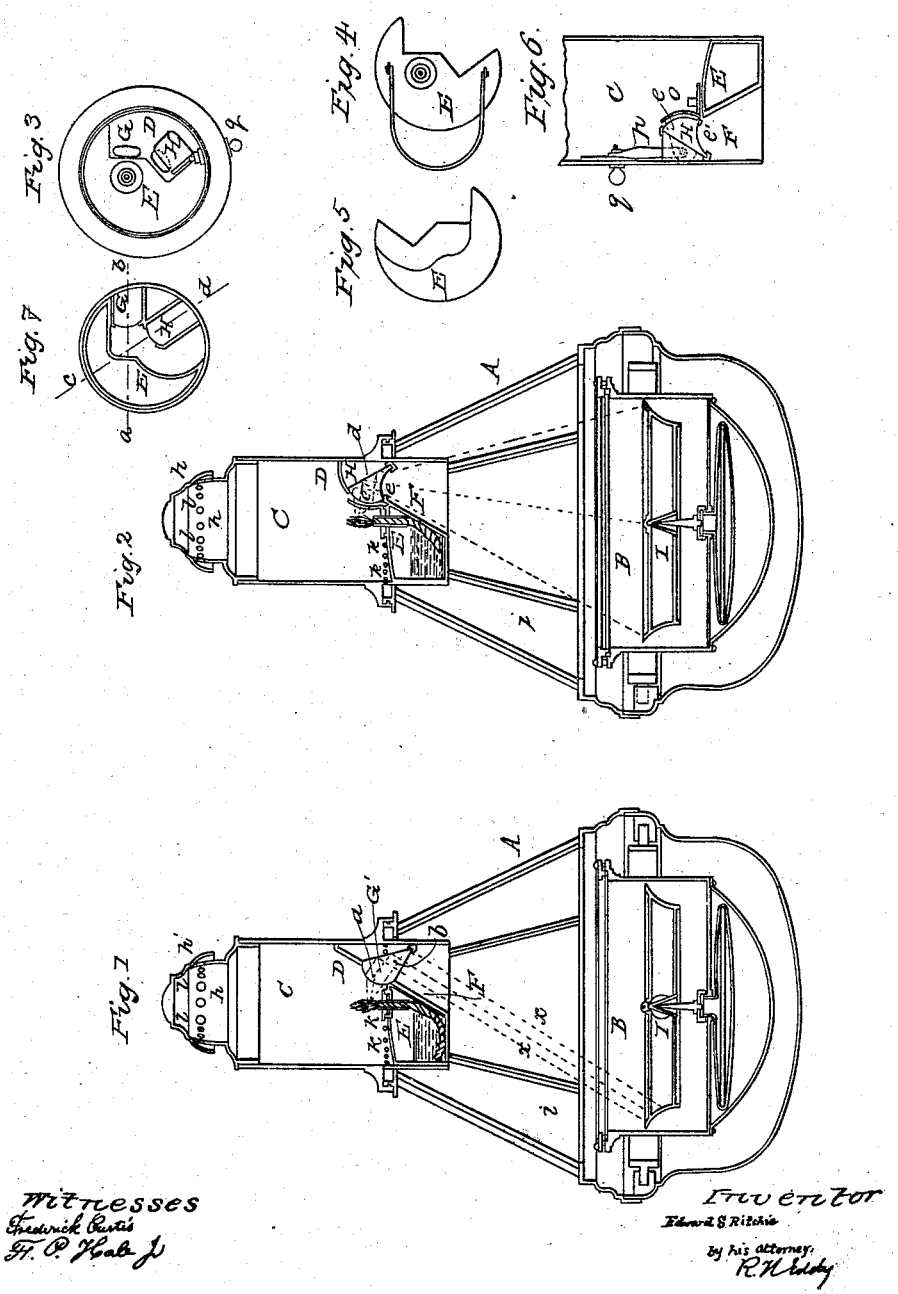

UNITED STATES PATENT OFFICE.

E. S. RITCHIE, OF BROOKLINE, MASSACHUSETTS.

IMPROVEMENT IN BINNACLES.

Specification forming part of Letters Patent No. 48,443, dated June 27, 1865.

*To all whom it may concern:*

Be it known that I, EDWARD S. RITCHIE, of Brookline, in the county of Norfolk and State of Massachusetts, have made a new and useful invention having reference to binnacles for navigable vessels; and I do hereby declare the same to be fully described in the following specification and represented in the accompanying drawings, of which—

Figures 1 and 2 are vertical sections of a binnacle provided with my invention. Fig. 3 is a horizontal section of the lamp-chamber of such binnacle. Fig. 4 is a top view, and Fig. 5 a bottom view, of the lamp. Fig. 6 is a section of the lamp-chamber, showing the movable screen and its actuating-slide applied to the chamber for intercepting the rays of light passing from the flame of the lamp to one of the lenticular prisms, to be hereinafter described.

The principal objects of my invention are to light the compass-card with a strong light at the point or place where the magnetic course is indicated and read, and to diffuse over the whole surface of the card a light of a considerably less intensity, and without producing any reflection from the glass cover of the compass-case, such as would be either disagreeable to the observer or calculated to obstruct his view of the card of the compass.

I am aware that a glass lamp or a bowl of oil provided with a wick and having a metallic mirror applied to it, so as to reflect the rays of the flame of the lamp downward through the bowl, has been placed in the upper part of a binnacle, and for illuminating the whole upper surface of the compass-card thereof. In this case, however, there results to the observer a very disagreeable reflection of the rays of light from the compass-glass, a difficulty which is wholly overcome by my improvement, in which, by an arrangement of lenticular prisms or their equivalents with respect to a lamp, the rays of light by such prisms are received through and discharged from small orifices or openings in front of and below the prisms in a manner not only to diffuse a soft and pleasant light over the compass-card, but to strongly illuminate those parts of it and the compass-box from which the magnetic course is to be read.

In the drawings, A denotes a binnacle arranged over a mariner's compass, B, and provided with a lamp-case, C, applied to its upper end. The lamp-case has a lenticular-prism case, D, which is furnished with a light-disseminating mouth, F, the two being arranged with respect to a lamp, E, placed in the lower part of the case C, in manner as shown in the drawings. The prism-case, as represented, contains two lenticular prisms, G H, which are shown in Fig. 7, which is a horizontal section taken through such prisms and the lamp-case.

The prism G is arranged with its lens $a$ and reflecting-face $b$ in such manner with respect to the wick of the lamp as to receive the rays from the flame of such wick and reflect them in one concentrated beam or pencil down through the mouth F, and not only upon the "lubber's line," or that line in the compass-bowl which indicates the direction of the vessel's head, but upon that portion of the card near this line which it may be desirable to have seen by an observer when in the act of reading a course from the card. The march of the rays from the lamp is represented in Fig. 1 by the lines $x\ x$. By the peculiar form of the prism G, as represented in Fig. 1, the rays diverging from the flame of the lamp as they fall on the convex surface of the lens $a$ will be refracted into parallelism, or nearly so, with one another, and, striking on the mirror or reflecting face $b$ of the prism, will be deflected thereby in one broad beam upon and so as to strongly illuminate the lubber's line and that part of the card which is immediately adjacent thereto.

Near to the prism G, and in the case D, is the other prism, H, which is arranged relatively to the said prism G and to the wick-tube of the lamp and the card I of the compass in manner as shown in Figs. 2 and 7, in which case it will be seen that the middle ray reflected from the prism strikes on, or about on, the central part of the compass card. The lenticular prism H not only has a convex receiving-face, $e$, and a reflecting mirror or face, $d$, arranged with respect to each other as shown in Fig. 2, but it has a concavity, $e'$, in its lower part, by which the rays of light from the reflector $d$, as they escape from the prism, are deflected or dispersed so as to spread over the whole, or nearly the whole, of the top surface of the compass-card. In this way an agreeable and mild illumination of the card is effected.

The body of the lamp E is to be made of a form to correspond with that part of the chamber in which it is to be placed, such form being exhibited by the drawings.

The dome $h$, with its cap $h'$, of the lamp-case C may be applied to such case, so as to be capable of being lifted off the same, in order to removal and replacement of the lamp as occasion may require.

The air for supply of the lamp is received from the binnacle-chamber $i$, through openings $k$ made through the side of the lamp-chamber, the smoke and volatile products of combustion from the lamp being caused to escape by means of openings $l$ made through the dome, such openings being covered by the cap, so as to be protected in the ordinary manner.

A screen or shutter, $o$, attached to a lever, $p$, provided with a knobbed working-slide, $q$, may be applied to either or both of the lenses of the prisms and in the lamp-chamber, the application of such screen being such as to enable a person near the binnacle, by seizing and moving the knob $r$ of the slide $q$, to either cover the lens of the prism so as to shut off the light therefrom, or uncover it, so as to enable it to receive the light from the lamp, as circumstances may require. The lens of each prism projects through an opening in the side of the prism-case, and there are also similar openings made through the bottom of the said case, in order for the proper escape of the rays of light reflected from the mirrors of the prisms.

What I claim as my invention is—

1. The combination of one or two lenticular prisms, or the equivalent or equivalents thereof, with a binnacle and its lamp, substantially in manner and for the purpose of illuminating the compass or part of the same and a part of the compass-box, as specified.

2. The binnacle-lamp as made with a recess in its side to cause it to rest on the bottom of the lamp-chamber and fit around the prism-case, as specified.

3. The combination as well as the arrangement of the prism-case D and the light-discharging passage or mouth F with the binnacle-chamber and the lamp-chamber, as specified.

4. The combination of the movable shutter or screen $o$ and its operative mechanism with the lamp, the lenticular prism and its case, and the lamp and binnacle chambers, arranged substantially as specified.

E. S. RITCHIE.

Witnesses:
F. P. HALE, Jr.,
H. E. FISHER.